June 4, 1968  H. R. CHOPE  3,387,133
THICKNESS MEASURING GAUGE COMPRISING A RADIOACTIVE
SOURCE AND SOLID STATE RADIATION DETECTOR
Filed Feb. 3, 1964  2 Sheets-Sheet 1

INVENTOR
HENRY R. CHOPE.

BY Cushman, Darby & Cushman
ATTORNEYS

June 4, 1968         H. R. CHOPE        3,387,133
THICKNESS MEASURING GAUGE COMPRISING A RADIOACTIVE
SOURCE AND SOLID STATE RADIATION DETECTOR
Filed Feb. 3, 1964                                          2 Sheets-Sheet 2

INVENTOR
HENRY R. CHOPE

BY Cushman, Darby & Cushman
ATTORNEYS

United States Patent Office 3,387,133
Patented June 4, 1968

3,387,133
THICKNESS MEASURING GAUGE COMPRISING A RADIOACTIVE SOURCE AND SOLID STATE RADIATION DETECTOR
Henry R. Chope, Columbus, Ohio, assignor to Industrial Nucleonics Corporation, a corporation of Ohio
Continuation-in-part of application Ser. No. 56,849, Sept. 19, 1960. This application Feb. 3, 1964, Ser. No. 341,978
15 Claims. (Cl. 250—83.3)

This application is a continuation-in-part of my copending application, Ser. No. 56,849, filed Sept. 19, 1960, entitled, measuring system, which matured into U.S. Patent No. 3,158,028 on Nov. 24, 1964.

This invention relates to solid state radiation detectors, and particularly to the use of such detectors in circuits to measure variations in certain characteristics, for example physical variables including mechanical displacements, pressure charges, and the like, as well as the thickness of sheet material.

In that application, there is set forth a new class of transducers which measure any physical variable by translating that variable to a signal of proper form and magnitude for further display or processing. This is accomplished by modifying nucleonic radiation. A unique digital system for counting pulses resulting from variations in the radiation, which in turn result from variations in the physical variable, is also set forth.

It is an object of the present invention to improve upon the equipment in that prior application by making the radiation detectors of the solid state type, and also to make the electronics utilized therewith for indicating variations in the radiation and physical variable being measured of the solid state type.

Another object, in conjunction with the foregoing object, is the provision of a solid state radiation detector in the form of a radiation sensitive capacitor which changes its capacitance in response to variations in the intensity of received radiation.

Still a further object is the provision of such a capacitor as part of an oscillator circuit, with the frequency of oscillation being thereby varied in accordance with changes in received radiation.

Another object of this invention is the provision of either an analog or digital channel for providing the desired indication of variations in received radiation.

A further object of this invention is the provision in equipment for measuring a variable by use of nucleonic radiation, of a solid state element which receives the radiation and thereby changes its internal characteristics so as to operate in the manner of a relaxation or blocking oscillator with output pulses whose rate or period is a function of the radiation intensity.

With this invention, there may be obtained the advantages of equipment which is more shock proof, smaller, more responsive, and faster in operation. There is no degradation effect on the solid state capacitor or oscillator type detector element, thereby preventing progressive damage and allowing long-term usage.

Other objects and advantages of this application will become apparent upon reading the appended claims and the following detailed description of various embodiments of the invention, in conjunction with the drawings, in which:

Figure 1:
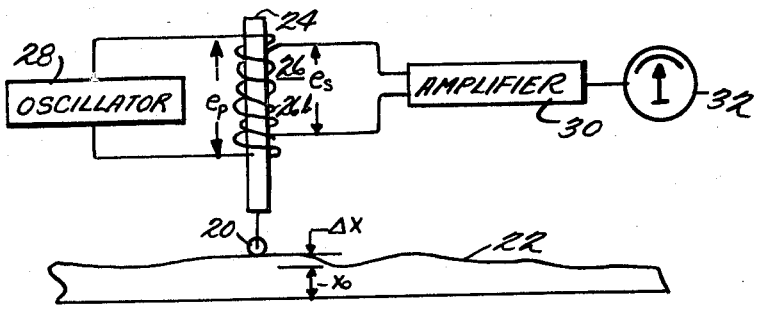
FIGURE 1 illustrates a conventional magnetic gauge whose output is an analog electric signal used for measurement of sheet thickness or displacements along a surface.

In the prior art of FIGURE 1, there is shown a conventional displacement transducer based on modifications of a magnetic field in accordance with changes in displacement. In this illustration a small wheel 20 contacts and rolls along the surface of a sheet 22. The rolling wheel 20 is attached to a movable magnetic core 24 coupling the primary 26a and the secondary 26b windings of a transformer 26. An oscillator 28 supplies a voltage $e_p$ to the primary 26a of the transformer. The voltage $e_s$ appearing across the transformer secondary then varies in accordance with the upward and downward movements of the rotating, contacting wheel 20. The voltage $e_s$ is amplified by amplifier 30 and indicated on a thickness meter 32. Therefore changes in thickness or displacement are indicated by the reading of the thickness meter.

Figure 2:
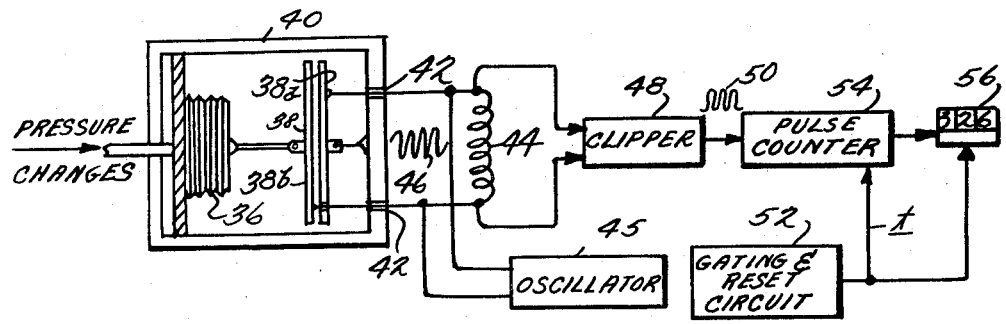
FIGURE 2 illustrates a measuring transducer in which pressure is measured by changing the electric field between two capacitance plates so as to vary the frequency of an oscillator and in which the output is a digital signal.

FIGURE 2 illustrates a pressure measuring transducer based upon techniques which provide a digital output. Most conventional transducers yield an analog output. By analog output is meant an electrical signal, such as a voltage or current, or a mechanical signal, such as a shaft or lever position, which varies continuously in accordance the variation in some other physical quantity. By digital signal output is meant a succession of discrete pulses which can be counted or otherwise tabulated so as to yield discrete numbers or numerical values related to a quantity being measured.

In FIGURE 2 expandable bellows 36 are mounted in line with a capacitor 38. The capacitor comprises one fixed plate 38a and one variable plate 38b. The movable plate 38b is mechanically coupled to one end of bellows 36. Further, inert gases at a fixed pressure are preferably sealed within an outer chamber 40 so as to maintain essentially a contant pressure on one surface of the bellows. As the pressure changes, the bellows expand and vary the spacing between the two capacitor plates. Connections are made to two feed-through terminals 42. These feed-through terminals are connected to opposite ends of an electrical inductance 44. The capacitance 38 and inductance 44 then form a tank circuit of an oscillator 45. As the capacitor's spacing changes in accordance with pressure changes, the frequency of the tank circuit consisting of the capacitor and inductor is varied. Individual oscillator voltage cycles or output pulses 46 are shown in somewhat enlarged fashion at a point beyond the tank circuit. The symmetrical oscillating cycles from the tank circuit are passed through an electrical clipper 48. The clipper 48 may include biased diodes (not shown) which remove the negative half of each cycle. At the output of the clipper 48 there is obtained a sequence or train of unidirectional pulses 50 whose number and count per defined or constant period is related to the original pressure changes. A gating and reset circuit 52 activates a counter 54 for pulses 50 and allows the counter to count for a period of time designated herein by $t$ seconds. The number of pulses counted per period $t$ is then registered on a mechancal digital counter 56. At the end of each perod $t$ the pulse counter is reset to zero condition so as to be ready for the next counting period, while simultaneously the mechanical digital counter is reset to indicate zero. Therefore, the reading of the mechanical counter at discrete times corresponding to the end of each period $t$ is an indication of input pressure changes to the transducer.

Figures 3, 7:
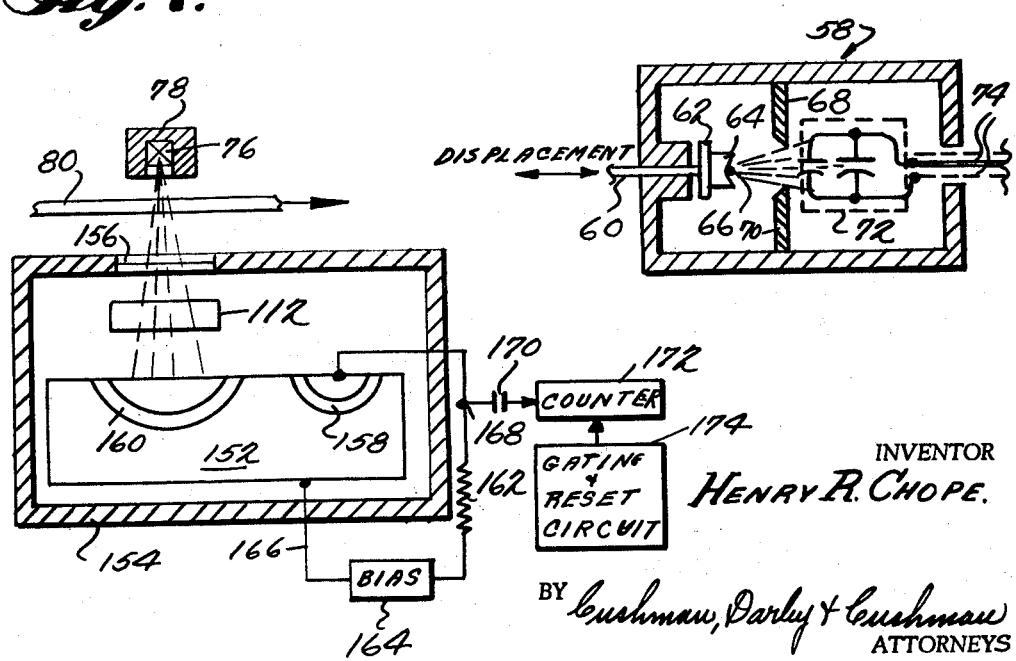
FIGURE 3 illustrates a measuring transducer constructed in accordance with the present invention for measuring mechanical displacement using nucleonic radiation and a solid state variable capacitor.
FIGURE 7 illustrates a further embodiment of this invention, in which a solid state radiation detector operates in circuit as a relaxation or blocking oscillator.

The transducer 58 in FIGURE 3 may be utilized to measure variations in a variety of physical variables including temperatures, pressures, thickness of objects, velocities, accelerations and the like with little change, as well as mechanical displacements imparted to rod 60. On the interior end of that rod is a base 62 upon which is set a radiator shield 64 and a source of radiation 66. This radiation source, as well as all of the others herein, is a radioactive isotope which emits radiation caused by decay of the isotope. The radiation or rays from the source may include subatomic particles, such as alpha and beta particles, or alternatively, true electromagnetic radiation, such as gamma radiation or radioactive isotope-produced X-radiation.

Radiation baffles 68 and 70 circumscribe the area of radiation from source 66 which reaches the solid state radiation sensitive capacitor 72. It is to be understood that movement of the radiation source toward and away from capacitor 72, in conformance with displacements of rod 60, causes corresponding variations in the capacitance of capacitor 72. The output lines 74 may be connected to circuitry similar to that shown in FIGURE 2, in the manner of output lines 42. Alternatively, output line 74 of FIGURE 3 may be connected to the detailed circuitry illustrated in FIGURE 4.

Figure 4:
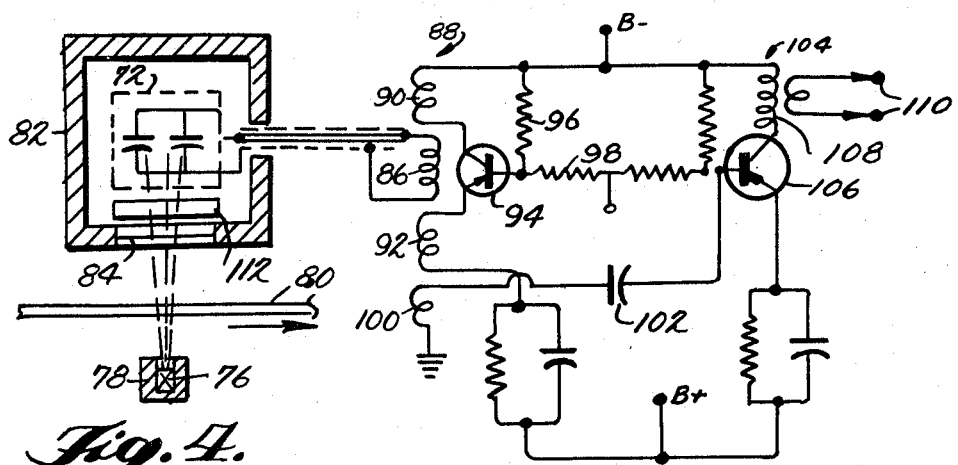
FIGURE 4 illustrates another embodiment of the present invention, in which a solid state capacitor is utilized to measure thickness variations in a sheet of material to cause corresponding variations in the frequency of an oscillator.

The equipment in FIGURE 4 has as its main purpose the measurement of basis weight or thickness of a sheet of material passing through the radiation field. Conventional U- or O-shaped brackets may be employed to scan the sheet transversely as it moves longitudinally, if desired. The radiation source 76 is disposed in and collimated by a radiation shield 78 so as to be directed toward the sheet of material 80 the thickness of which is being measured. A solid state radiation sensitive capacitor 72 is disposed in a radiation proof casing 82, with radiation entering through a window 84. The radiation capacitor 72 forms, in conjunction with an inductance 86, a frequency determining tank circuit. As the radiation falling upon the capacitor changes its capacitance so varies the frequency of the tank circuit. Inductance 86 is coupled into a transistorized oscillator 88 through coils 90 and 92, which are respectively connected to the collector and emitter of transistor 94 the base of which is set at a predetermined voltage by the potential divider comprising resistors 96 and 98. The output of the oscillator circuit 88 is coupled into an inductance 100, and via condenser 102 is applied to amplifier 104, which includes transistor 106. The signal is amplified and fed through transformer 108 to its output terminals 110. Preferably, oscillator 88 and amplifier 104 are placed physically near tank circuit 72, 86.

Preferably, the solid state electronics in FIGURE 4 substitutes for the conventional preamplifier circuit in nucleonics thickness gauges. The solid state oscillator is one in which (in first order effects) the frequency of the oscillator is not effected by changes in transistor parameters. Thus, the oscillating frequency of the oscillator is determined by the capacitance of the radiation sensitive capacitor. As exemplary, oscillator 88 may operate at approximately 30 megacycles.

Encasement 82 in FIGURE 4 is a radiation shielding can or the like in which the solid state capacitor detector is sealed. Preferably, the temperature of the sealed chamber is regulated by heater-thermostated elements not shown.

As indicated inside the dash line box representing the radiation sensitive capacitor, a plurality of capacitive elements may be employed to obtain the sensitivity desired. Such capacitive elements may be electrically connected in parallel as shown.

In some gauges, an energy transformer or scintillation element 112 (FIGURE 4) is placed near the surface of the radiation sensitive capacitor 72 so that the radiation will pass through the transformer prior to entering the capacitor. The function of this energy transformer 112 is to soften the radiation, i.e., to reduce the average energy of the incoming radiation (beta particles or gamma atoms) in order to cause the capacitor to be more sensitive to the incident radiation energy upon it.

Figure 5:
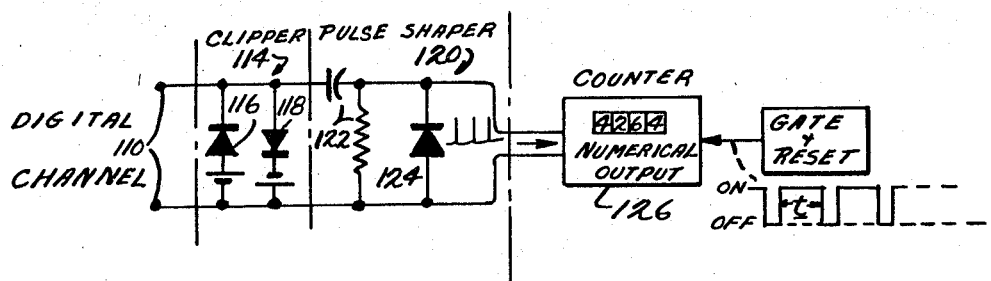
FIGURE 5 illustrates a digital channel which may be connected to the output of FIGURE 4 to provide a numerical registration.

Since the signal information at terminals 110 in FIGURE 4 is in the form of a frequency, it is possible by shaping individual cycles to convert the output to a strictly digital format in a manner similar to that illustrated in FIGURE 2. FIGURE 5 is a detailed schematic drawing of such a digital channel. The oscillating cycles of variable frequency as applied to terminals 110 in FIGURES 4 and 5 are processed in a clipper 114 by biased oppositely poled diodes 116 and 118 to yield unidirectional pulses. These are sharpened in a pulse shaping network 120 in which the capacitance resistance combination 122 differentiates the unidirectional pulses and the shunting diodes 104 removes any overshoot on the pulses. A gated counter 126 is then utilized to convert the pulse train to a corresponding numerical output. This operation is accomplished by counting for a predetermined period $t$ determined by pulses from gate 128. Between successive counting periods, the illustrated negative-going pulses reset the counter and ready it for the next counting sequence.

Figure 6:
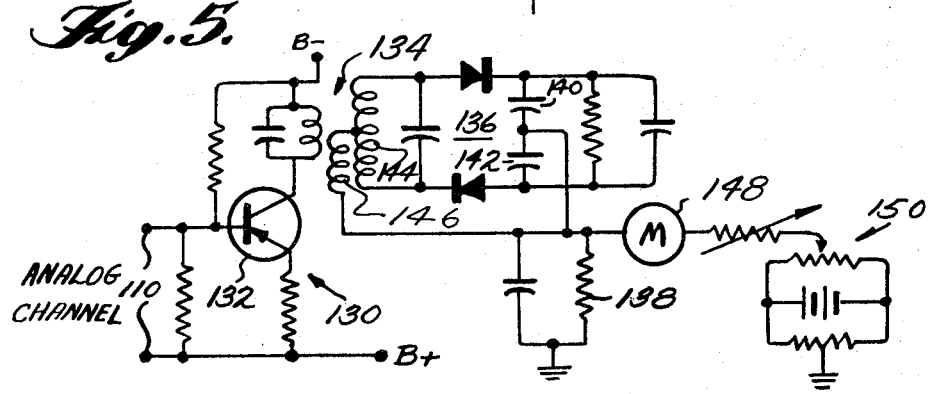
FIGURE 6 illustrates an analog channel which may be connected to the output of FIGURE 4 to cause an analog indication of variations in sheet thickness.

Although the preferred embodiment of the invention for many applications is a measuring instrument with a digital output, an analog output can be obtained by detecting or integrating the variable frequency signals available from FIGURE 4. This operation is accomplished in the analog channel shown in FIGURE 6. The varying signal received at terminals 110 in FIGURE 6, is amplified by amplifier 130, which includes transistor 132. This amplifier is an amplitude limiting device the function of which is to remove amplitude variations in the variable frequency signal. The resulting constant amplitude varying frequency signal is coupled through a transformer 134 into a ratio detector 136, which operates to convert the variable signal to a corresponding analog voltage, in conventional manner. This analog output is developed across resistor 138, which is connected from between the diode output condensers 140 and 142 to the center of the secondary coil 144 via a choke coil 146. The analog voltage across resistor 138 is supplied to meter 148 for purposes of indicating therein variations in the capacitance of the radiation sensitive capacitor 72 of FIGURES 3 or 4, and consequently variations in the characteristic being gauged. A sensitivity and operating point adjustment circuit 150 for the measuring circuit is connected to meter 148.

The above combination of FIGURES 4 and 6 including the radiation source, radiation sensitive capacitor, and associate solid state electronics is particularly useful for radiation thickness and density gauges. In instances in which subsequent data processing of the system is required the FIGURE 5 digital form of the output is useful.

Because of the solid state nature of the detector and electronics, both of the circuits of FIGURES 5 and 6 in conjunction with the detector and electronics of FIGURE 4 may be packaged in a volume of 100 cubic centimeters, for example in a cylinder 8 cm. long and 4 cm. in diameter.

The embodiment shown in FIGURE 7 is adapted to measure the thickness of sheet 80 by a radiation source disposed in shield 78. This embodiment includes a solid state element 152 surrounded by casing 154 which has a radiation window 156. An energy transformer 112, as above described, may be employed as desired.

The solid state element 152 may be a block of silicon with a conductor connected p-n junction 158 separated from a p-n junction 160 with no connection. The p-n junctions or regions, which may also be termed depletion layers or transition regions, are darkened in FIGURE 7 for illustrative purposes. As illustrated, the radiation from source 76 falls on the unconnected p-n junction 160. In operation, the radiation builds up a surplus population of holes and electrons in the depletion layer 160. Due to the bias 164 on junction 158, there is a periodic sweep of the hole electron pairs from junction 160 to junction 158. The leakage between the connected p-n region and the unconnected p-n region gives rise to a closed circuit current through conductor 160, resistor 162, bias source 164, and conductor 166 which is connected to the silicon body 152.

The initial value of the closed circuit current is a function of the radiation intensity. However, as the current flows, the excess electron-hole population becomes depleted and the closed circuit current drops off in value until the radiation can build up an excess hole electron population again. There is a periodic change in the conductivity of the element 152 due to its operation and connection. Thus, a periodic build-up and drop-off current will occur. Such constitutes a periodic (though not sinusoidal) current whose rate or period is a function of the radiation intensity. The DC base of the pulses at junction 168 is eliminated by condenser 170 and the resulting pulses are applied to a counter 172. As in the prior embodiments, a circuit 174 gates the counter on for successive predetermined times between which it resets the counter. Since the rate or period of the pulses is a function of the radiation received, which is a consequence of variations in thickness of sheet 80, the number of pulses counted during any given period by counter 172 relates to the thickness of the sheet during that time. A low pass filter may be employed ahead of the counter if necessary to remove higher frequencies.

From the foregoing, it will be apparent that the solid state element 152 as connected with bias 164 operates like a relation or blocking oscillator as long as junction 160 receives radiation.

From the foregoing, it will be apparent that there has been provided apparatus which will accomplish the objects and advantages herein mentioned. Still other objects and advantages, and even modifications of the invention, will become apparent to those of ordinary skill in the art upon reading this disclosure. However, this disclosure is to be considered exemplary and not limitative, the scope of the invention being defined by the appended claims.

What is claimed is:

1. Apparatus for gauging a characteristic comprising:
   means, including solid state nucleonic radiation detecting means, for providing output pulses varying in number according to the quantity of nucleonic rays reaching said detecting means, said detecting means including a solid state radiation sensitive capacitor,
   means, including a nucleonic radiation source having its rays directed toward said detecting means, for varying the quantity of said rays reaching said detecting means in accordance with variations in said characteristic, and
   means operative on said output pulses to indicate the variations in said characteristic, said output providing means including an oscillator comprising said capacitor and variable in frequency with variations in capacitance of said capacitor to provide said varying-number pulses.

2. Apparatus as in claim 1 including means for varying the distance between said radiation source and capacitor in accordance with variations in said characteristic.

3. Apparatus as in claim 1 wherein said varying means includes a sheet of material the thickness of which is said characteristic.

4. Apparatus for gauging a characteristic comprising:
   means, including solid state nucleonic radiation detecting means, for providing output pulses varying in number according to the quantity of nucleonic rays reaching said detecting means wherein said solid state detecting means includes a block of semiconductor material having two p-n junctions, one of said junctions being disposed to receive said rays, the other said junction being electrically connected to effect said output pulses from said other p-n junction with a period which is a function of the intensity of said rays on said one p-n junction,
   means including a nucleonic radiation source having its rays directed toward said detecting means, for varying the quantity of said rays reaching said detecting means in accordance with variations in said characteristic, and
   means operative on said output pulses to indicate the variations in said characteristic.

5. Apparatus as in claim 4 and further including an energy transformer in the path of said rays adjacent said one p-n junction.

6. Apparatus as in claim 4 wherein said indicating means includes a counter and means for resetting and gating said counter on for predetermined times.

7. Apparatus as in claim 4 wherein said varying means includes a sheet of material the thickness of which is said characteristic.

8. A solid-state radiation sensitive device comprising:
   a block of semiconductor material, said block including a first depletion layer or transition region upon which said radiation falls and in which a population of holes and electrons is built up, the said population being greater than that when no radiation is present, and said block including a second depletion layer or transition region; and
   means for biasing said second depletion layer thereby periodically sweeping the hole-electron pairs from said first depletion layer through said semiconductor material to said second depletion layer and causing the rate of the current pulses through said second junction to vary as a function of the intensity of said radiation; and
   energy transformer means disposed adjacent said first depletion layer for softening the said radiation falling on said first depletion layer.

9. A device as in claim 8 where said depletion layers are p-n junctions.

10. A nucleonics gauging system including a device as in claim 8 where the said intensity of the radiation is a function of the characteristic being gauged, said gauging system also including means for determining the period of the current pulses through the said second junction and thereby gauging said characteristic.

11. Apparatus as in claim 10 where said period determining means includes a counter for counting the number of said pulses over a predetermined time interval.

12. Apparatus as in claim 8 where said block of material is silicon.

13. Apparatus for gauging a characteristic comprising:
    means, including solid state nucleonic radiation detecting means, for providing output pulses varying in number according to the quantity of nucleonic rays reaching said detecting means, said detecting means including a solid state radiation sensitive capacitor and means including an oscillator comprising said capacitor and variable in frequency with variations in capacitance of said capacitor to provide said varying-number pulses,
    means, including a nucleonic radiation source having its rays directed toward said detecting means, for varying the quantity of said rays reaching said detecting means in accordance with variations in said characteristic, and indicator means comprising a digital channel including means for clipping said pulses, a counter receiving the latter pulses, and means for resetting and gating said counter on for predetermined times.

14. Apparatus as in claim 13 wherein said indicating means includes an analog channel comprising a meter and a ratio detector coupled between said meter and oscillator.

15. Apparatus as in claim 14 and further including an amplitude limiter between said oscillator and ratio detector.

References Cited

UNITED STATES PATENTS

| | | | |
|---|---|---|---|
| 2,500,473 | 3/1950 | Spaeth | 250—83.3 |
| 2,920,206 | 1/1960 | Heller | 250—83.3 X |
| 2,922,887 | 1/1960 | Jacobs | 250—83.3 X |
| 2,957,081 | 10/1960 | Chapman | 250—83.3 |
| 2,958,781 | 11/1960 | Marchal et al. | 250—83.3 |
| 2,963,583 | 12/1960 | Lebourg | 250—43.5 X |
| 3,007,052 | 10/1961 | Hickman et al. | 250—83.3 |
| 3,114,837 | 12/1963 | Thomas | 250—83.3 |
| 3,173,004 | 3/1965 | McKenzie | 250—43.5 |
| 3,207,902 | 9/1965 | Sandborg | 250—83.3 |

ARCHIE R. BORCHELT, *Primary Examiner.*